(12) United States Patent
Shimizu et al.

(10) Patent No.: US 11,226,235 B2
(45) Date of Patent: Jan. 18, 2022

(54) ABSORPTION SPECTROSCOPIC SYSTEM, PROGRAM RECORDING MEDIUM FOR AN ABSORPTION SPECTROSCOPIC SYSTEM AND ABSORBANCE MEASUREMENT METHOD

(71) Applicant: HORIBA STEC, Co., Ltd., Kyoto (JP)

(72) Inventors: Toru Shimizu, Kyoto (JP); Yuhei Sakaguchi, Kyoto (JP); Masakazu Minami, Kyoto (JP)

(73) Assignee: HORIBA STEC, CO., LTD., Kyoto (JP)

( * ) Notice: Subject to any disclaimer, the term of this patent is extended or adjusted under 35 U.S.C. 154(b) by 0 days.

(21) Appl. No.: 16/860,602

(22) Filed: Apr. 28, 2020

(65) Prior Publication Data

US 2020/0355551 A1 Nov. 12, 2020

(30) Foreign Application Priority Data

May 9, 2019 (JP) .............................. JP2019-089177

(51) Int. Cl.
 *G01J 3/42* (2006.01)
 *G01N 21/31* (2006.01)

(52) U.S. Cl.
 CPC ............... *G01J 3/42* (2013.01); *G01N 21/31* (2013.01)

(58) Field of Classification Search
 None
 See application file for complete search history.

(56) References Cited

U.S. PATENT DOCUMENTS

| 5,426,593 A * | 6/1995 | Seiden ................... G01N 27/49 702/24 |
| 8,976,358 B2 * | 3/2015 | Feitisch ................ G01J 3/0297 356/437 |
| 2007/0242275 A1 * | 10/2007 | Spartz ................... G01N 21/45 356/451 |
| 2008/0225296 A1 * | 9/2008 | Liu ..................... G01N 21/3504 356/437 |

(Continued)

FOREIGN PATENT DOCUMENTS

JP 2004-101416 A 4/2004

*Primary Examiner* — Shawn Decenzo
(74) *Attorney, Agent, or Firm* — Greenblum & Bernstein, P.L.C.

(57) ABSTRACT

An absorption spectroscopic system is provided with a detector that detects an intensity of light transmitted through a gas, a total pressure sensor that measures a total pressure of the gas, an interference gas partial pressure-absorbance relationship storage unit that stores interference gas partial pressure-absorbance relationship data, an interference gas partial pressure estimation unit that estimates the partial pressure of the interference gas based on the total pressure measured by the total pressure sensor, an interference gas absorbance conversion unit that converts an estimated partial pressure of the interference gas estimated by the interference gas partial pressure estimation unit into an absorbance of the interference gas based on the interference gas partial pressure-absorbance relationship data, and a target gas absorbance calculation unit that calculates an absorbance of the target gas based on output values from the detector and on the absorbance of the interference gas.

7 Claims, 8 Drawing Sheets

(56) References Cited

U.S. PATENT DOCUMENTS

2011/0299084 A1* 12/2011 Feitisch ................ G01N 21/39
356/433
2016/0153898 A1* 6/2016 Minami ............. G01N 21/3504
137/455

* cited by examiner

ABSORPTION SPECTROSCOPIC SYSTEM, PROGRAM RECORDING MEDIUM FOR AN ABSORPTION SPECTROSCOPIC SYSTEM AND ABSORBANCE MEASUREMENT METHOD

TECHNICAL FIELD

The present invention relates to an absorption spectroscopic system, a program recording medium for an absorption spectroscopic system and an absorbance measurement method.

TECHNICAL BACKGROUND

Conventionally, an absorption spectroscopic system that is provided with a detector which detects an intensity of light transmitted through a gas, and a total pressure sensor that measures a total pressure of the gas is known as system that measures a concentration of a gas being measured (this may be referred to below as a 'target gas') contained in a gas which is supplied to a supply destination such as a chamber of a film formation device or the like in a semiconductor manufacturing process.

The detector is constructed so as include, for example, a light source that irradiates light onto a gas flowing along a flow path, a filter that, out of the wavelengths of the light emitted from the light source, transmits light having a wavelength which is absorbed by the target gas (this may be referred to below as a 'measurement wavelength'), and a receiving unit that detects an intensity of the light of the measurement wavelength that has been transmitted through the gas.

In addition to the target gas, interference gases which absorb light of the measurement wavelength are also contained in the gas analyzed by the above-described conventional absorption spectroscopic system. In this case, because the detector detects the intensity of light of the measurement wavelength that has been absorbed not only by the target gas, but also by these interference gases, it is not possible to accurately measure the concentration of the target gas.

Because of this, in the above-described conventional absorption spectroscopic system, as is shown in Patent Document 1, a detector that is capable of detecting the intensities of light of a plurality of measurement wavelengths is used. The concentrations of the target gas and the interference gases can be calculated by solving simultaneous equations relating to the intensities of the light of each measurement wavelength detected by this detector.

DOCUMENTS OF THE PRIOR ART

Patent Documents

[Patent document 1] Japanese Unexamined Patent Application (JP-A) No. 2004-101416

DISCLOSURE OF THE INVENTION

Problems to be Solved by the Invention

It is a principal object of the present invention to provide an absorption spectroscopic system that, without using a detector that detects intensities of light of a plurality of measurement wavelengths, is able to accurately measure the concentration of a target gas from the intensity of light transmitted through a gas containing an interference gas.

Means for Solving the Problem

In other words, an absorption spectroscopic system according to the present invention is provided with a detector that detects an intensity of light transmitted through a gas, a total pressure sensor that measures a total pressure of the gas, an interference gas partial pressure-absorbance relationship storage unit that stores interference gas partial pressure-absorbance relationship data, an interference gas partial pressure estimation unit that estimates the partial pressure of the interference gas based on the total pressure measured by the total pressure sensor, an interference gas absorbance conversion unit that converts an estimated partial pressure of the interference gas which was estimated by the interference gas partial pressure estimation unit into an absorbance of the interference gas based on the interference gas partial pressure-absorbance relationship data, and a target gas absorbance calculation unit that calculates an absorbance of the target gas based on output values from the detector and the interference gas absorbance calculated by the interference gas absorbance conversion unit.

According to the above-described structure, because a partial pressure of an interference gas is estimated based on a total pressure measured by a total pressure sensor, and this estimated interference gas partial pressure is converted into an interference gas absorbance based on previously stored interference gas partial pressure-absorbance relationship data which shows relationships between interference gas partial pressures and absorbances, and an absorbance of the target gas is calculated based on the interference gas absorbance and the output values from the detector, it is possible to comparatively accurately measure the concentration of a target gas from the output values from a detector without having to use a detector that detects intensities of light of a plurality of measurement wavelengths.

Note that in a semiconductor manufacturing process, it is common for a gas having a low concentration of a target gas compared to the concentration of interference gases to be supplied to a supply destination, and in this case, the total pressure measured by the total pressure sensor can be estimated as an approximate interference gas partial pressure. Note that, when calculating the concentration of a target gas, even if this type of approximation is made, because the effects of any errors in the approximation are smaller than errors arising from the effects of interference gas on the intensity of light detected by a detector, the result is that the concentration of the target gas can still be accurately calculated.

Here, the absorbance in the interference gas partial pressure-absorbance relationship data represents an interference gas absorbance that is calculated based on output values detected by the detector provided in the absorption spectroscopic system.

For this reason, it is also possible to employ a structure in which the interference gas partial pressure estimation unit estimates the total pressure measured by the total pressure sensor as the partial pressure of the interference gas.

Note that an example of a specific structure of the above-described absorption spectroscopic system is one in which there is further provided a target gas partial pressure-absorbance relationship storage unit that stores target gas partial pressure-absorbance relationship data, and a target gas partial pressure conversion unit that converts the target gas absorbance calculated by the target gas absorbance calculation unit into the partial pressure of the target gas based on the target gas partial pressure-absorbance relationship data. In addition, another example of a specific structure of the above-described absorption spectroscopic system is one in which there is further provided an interference gas partial pressure calculation unit that calculates the partial pressure of the interference gas based on the total pressure measured by the total pressure sensor and on the target gas partial pressure calculated by the target gas partial pressure conversion unit.

Here, the absorbance in the target gas partial pressure-absorbance relationship data represents an absorbance of a target gas that is calculated based on output values detected by the detector provided in the absorption spectroscopic system.

Moreover, if there is a need for the concentration of a target gas to be calculated even more accurately using the above-described absorption spectroscopic system, then it is also possible to provide a second interference gas absorbance conversion unit that converts the partial pressure of the interference gas calculated by the interference gas partial pressure calculation unit into a second absorbance of the interference gas based on the interference gas partial pressure-absorbance relationship data, and for the target gas absorbance calculation unit to calculate a second absorbance of the target gas based on the output values from the detector and on the second interference gas absorbance calculated by the second interference gas absorbance conversion unit.

If this type of structure is provided, then the calculated partial pressure of the interference gas which has been calculated by the interference gas partial pressure calculation unit more closely approximates the actual interference gas partial pressure than does the interference gas estimated partial pressure that was estimated by the interference gas partial pressure estimation unit. Because of this, by converting the calculated partial pressure of the interference gas which was calculated by the interference gas partial pressure calculation unit into a second absorbance of the interference gas, and then recalculating a second absorbance of the target gas based on the second interference gas absorbance, it is possible to calculate a more accurate concentration of the target gas.

Moreover, a program recording medium for an absorption spectroscopic system according to the present invention is a program recording medium for an absorption spectroscopic system on which is recorded a program that is used in an absorption spectroscopic system which includes a detector that detects an intensity of light transmitted through a gas, and a total pressure sensor that measures a total pressure of the gas, and which causes a computer to function as an interference gas partial pressure-absorbance relationship storage unit that stores interference gas partial pressure-absorbance relationship data, an interference gas partial pressure estimation unit that estimates the partial pressure of the interference gas based on the total pressure measured by the total pressure sensor, an interference gas absorbance conversion unit that converts an estimated partial pressure of the interference gas estimated by the interference gas partial pressure estimation unit into an absorbance of the interference gas based on the interference gas partial pressure-absorbance relationship data, and a target gas absorbance calculation unit that calculates an absorbance of the target gas based on output values from the detector and on the absorbance of the interference gas calculated by the interference gas absorbance conversion unit.

In addition, an absorption spectroscopic device according to the present invention is used in an absorption spectroscopic system which includes a detector that detects an intensity of light transmitted through a gas, and a total pressure sensor that measures a total pressure of the gas, wherein the absorption spectroscopic device is provided with an interference gas partial pressure-absorbance relationship storage unit that stores interference gas partial pressure-absorbance relationship data, an interference gas partial pressure estimation unit that estimates the partial pressure of the interference gas based on the total pressure measured by the total pressure sensor, an interference gas absorbance conversion unit that converts an estimated partial pressure of the interference gas estimated by the interference gas partial pressure estimation unit into an absorbance of the interference gas based on the interference gas partial pressure-absorbance relationship data, and a target gas absorbance calculation unit that calculates an absorbance of the target gas based on output values from the detector and on the absorbance of the interference gas calculated by the interference gas absorbance conversion unit.

Moreover, an absorbance measurement method according to the present invention is an absorbance measurement method for a target gas that is contained in a gas using an absorption spectroscopic system which includes a detector that detects an intensity of light transmitted through the gas, and a total pressure sensor that measures a total pressure of the gas, wherein the absorbance measurement method is provided with a first step in which interference gas partial pressure-absorbance relationship data is stored, a second step in which the partial pressure of the interference gas is estimated based on the total pressure measured by the total pressure sensor and on a predicted concentration of the interference gas, a third step in which the estimated partial pressure of the interference gas which was estimated in the second step is converted into an absorbance of the interference gas based on the interference gas partial pressure-absorbance relationship data, and a fourth step in which an absorbance of the target gas is calculated based on the interference gas absorbance calculated in the third step and on output values from the detector.

Effects of the Invention

According to the absorption spectroscopic system that is formed in the above-described manner, it is possible, without using a detector that detects intensities of light of a plurality of measurement wavelengths, to accurately measure the concentration of a target gas from the intensity of light transmitted through a gas containing an interference gas.

BEST EMBODIMENTS FOR IMPLEMENTING THE INVENTION

Hereinafter, an absorption spectroscopic system according to an embodiment of the present invention will be described based on the drawings.

The absorption spectroscopic system according to the present embodiment is incorporated, for example, in a semiconductor manufacturing line or the like, and is used to measure a concentration of a gas being measured (this may be referred to below as a 'target gas') that is contained together with interference gases in a gas that is supplied to a supply destination.

Figure 1:
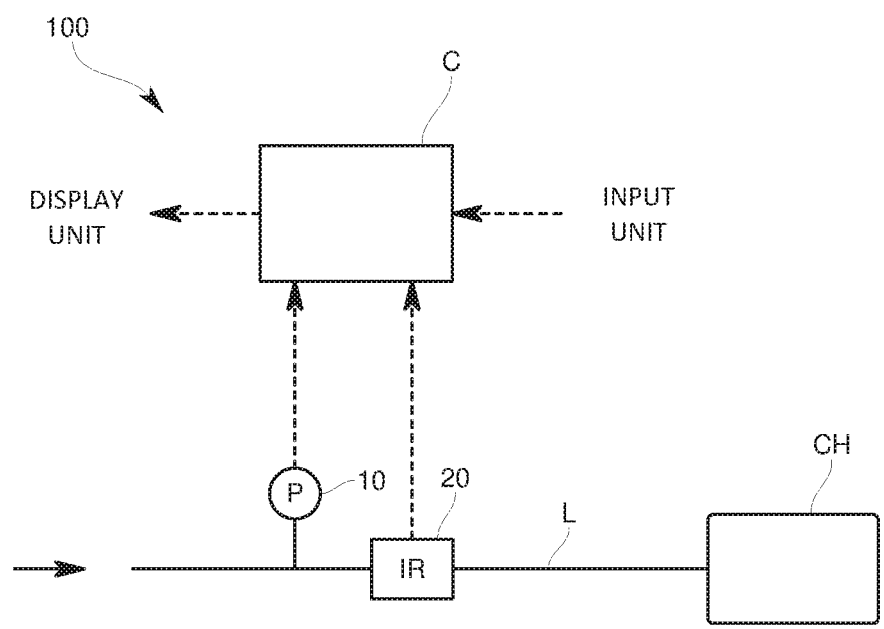
FIG. 1 is a schematic view showing an overall structure of an absorption spectroscopic system according to an embodiment.

As is shown in FIG. 1, an absorption spectroscopic system 100 according to the present embodiment is provided with a flow path L which is used to supply gas to a chamber CH (i.e., a supply destination), a total pressure sensor 10 which is disposed on the flow path L, a detector 20 which is disposed on the flow path L on a downstream side from the total pressure sensor 10, and an absorption spectroscopic device C.

The total pressure sensor 10 measures a total pressure of a gas flowing through the flow path L.

Figure 2:
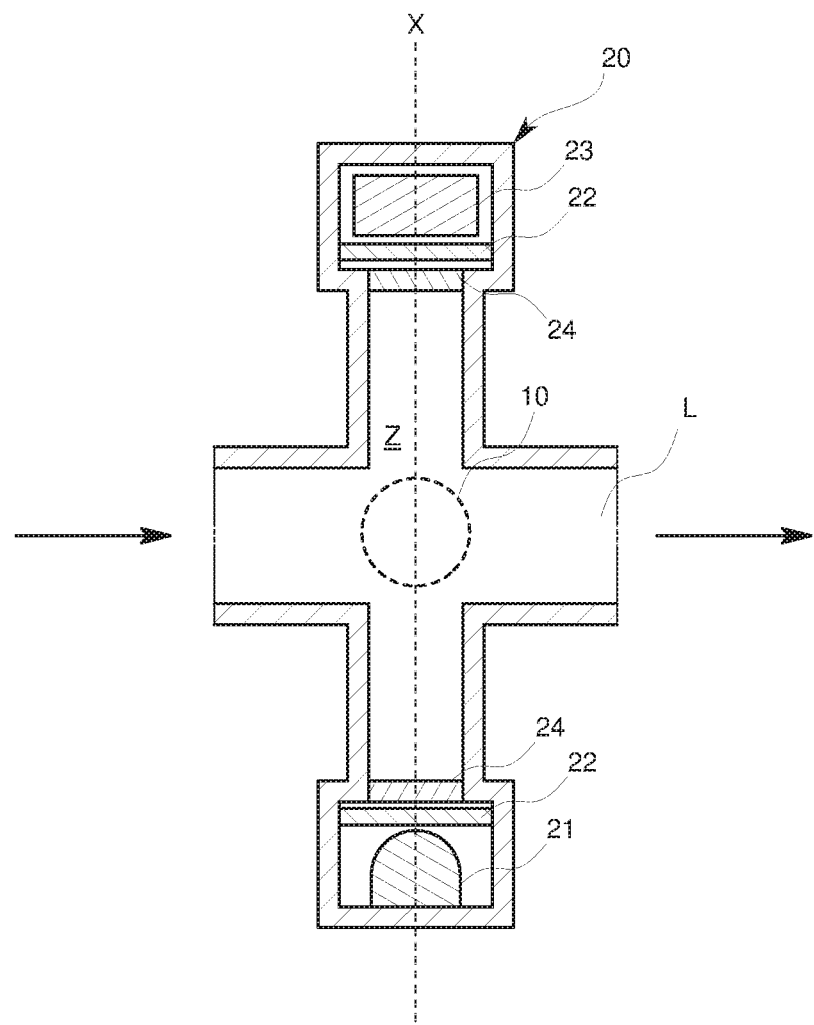
FIG. 2 is a schematic view showing a structure of a detector of the absorption spectroscopic system according to the embodiment.

The detector 20 detects an intensity of light that is transmitted through the gas flowing through the flow path L. More specifically, as is shown in FIG. 2, the detector 20 is provided with a light source 21 that irradiates light onto the gas flowing through the flow path L, filters 22 that, out of the wavelengths of the light emitted from the light source 21, transmit light of a wavelength (this may be referred to below as a 'measurement wavelength') that is absorbed by a target gas, and a light-receiving unit 23 that detects an intensity of the light of the measurement wavelength that has been transmitted through the filters 22. Note that in the detector 20, if an area of the flow path L through which the light emitted from the light source 21 is transmitted is taken as a measurement area Z, then the light source 21 is disposed on one side of this measurement area Z, and a filter 22 and the light-receiving unit 23 are disposed on another side of the measurement area Z. In addition, a window component 24 is provided respectively between the light source 21 and the flow path L and between the filter 22 and the flow path L. As a result, the light source 21, the filters 22, and the light-receiving unit 23 do not come into direct contact with the gas flowing through the flow path L. Additionally, the detector 20 outputs, as an output value, an output signal from the light-receiving unit 23 that shows the intensity of the light transmitted through the gas present in the measurement area Z.

Figure 3:
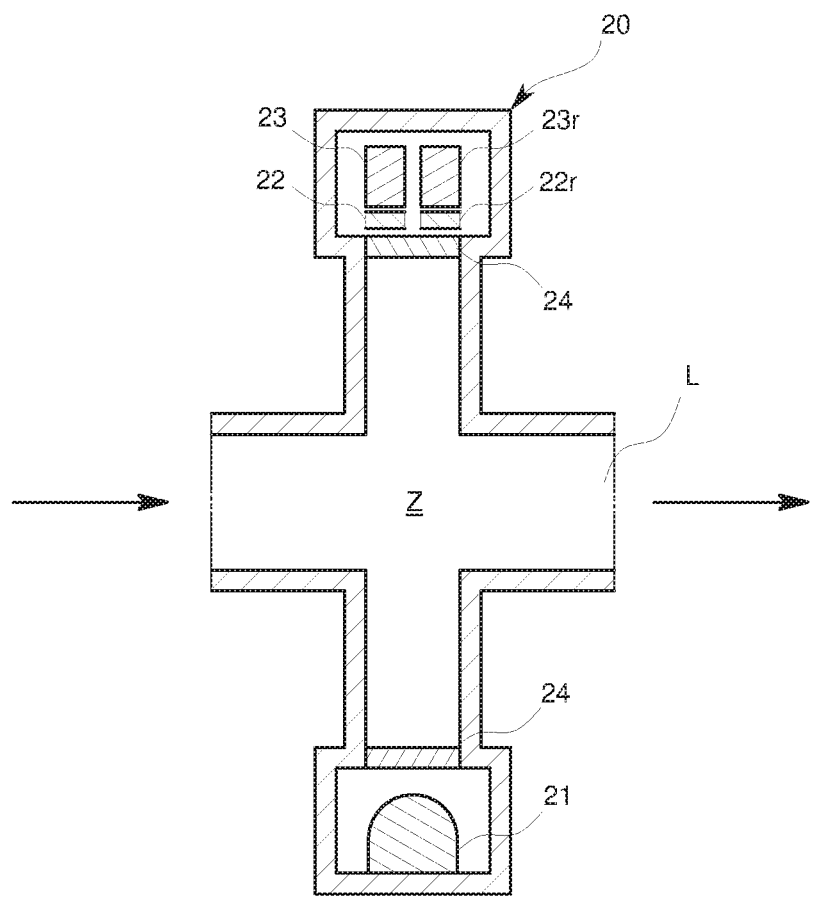
FIG. 3 is a schematic view showing a structure of a variant example of a detector of the absorption spectroscopic system according to the embodiment.

Note that, as is shown in FIG. 3, in addition to the filter 22 and the light-receiving unit 23 located on the other side of the measurement area Z in the detector 20, it is also possible to provide a reference filter 22r that transmits light of a wavelength that is not absorbed by a material gas, and a reference light-receiving unit 23r the detects the intensity of the light of wavelength that is transmitted through the reference filter 22r. In this case, it is possible to use a ratio between the output signal from the light-receiving unit 23 and the output signal from the reference light-receiving unit 23r as the output value from the detector 20.

Figure 4:
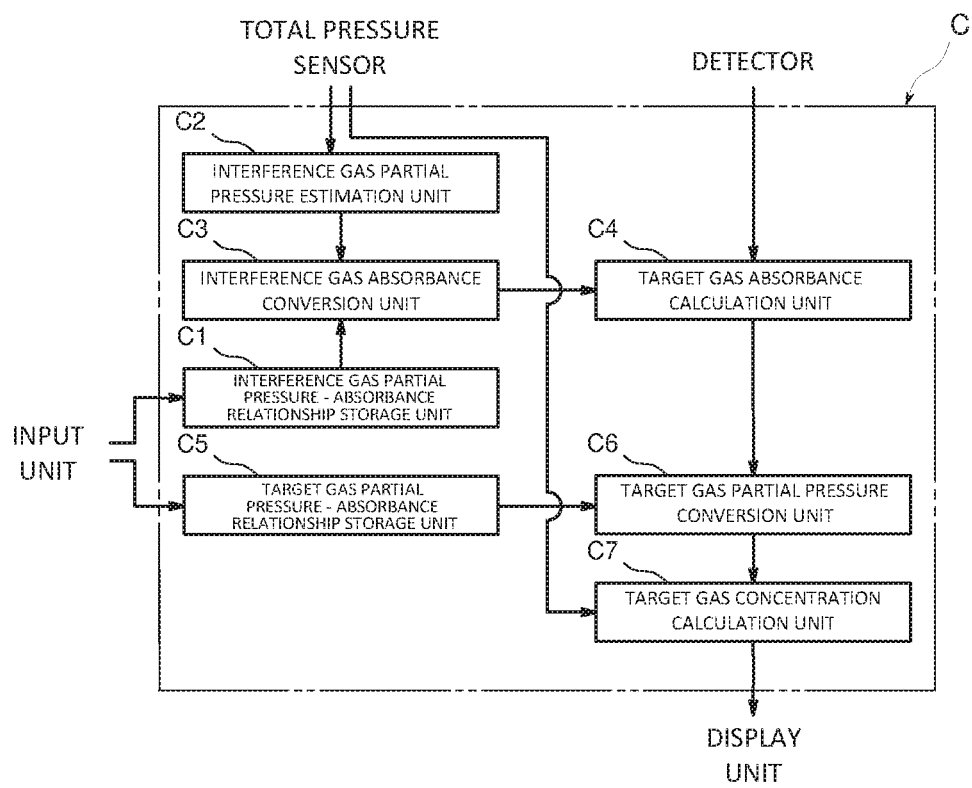
FIG. 4 is a block diagram showing functions of an absorption spectroscopic device according to the embodiment.

The absorption spectroscopic device C calculates the concentration and the like of the target gas, and is connected to at least the total pressure sensor 10 and the detector 20. More specifically, the absorption spectroscopic device C is a computer having a CPU, memory, an AD converter, a DA converter, and an input device and the like. As is shown in FIG. 4, a structure is employed in which, as a result of programs stored in the memory being executed by the CPU, the absorption spectroscopic device C functions as an interference gas partial pressure-absorbance relationship storage unit C1, an interference gas partial pressure estimation unit C2, an interference gas absorbance conversion unit C3, a target gas absorbance calculation unit C4, a target gas partial pressure-absorbance relationship storage unit C5, a target gas partial pressure conversion unit C6, and a target gas concentration calculation unit C7, and the like.

Figure 5:
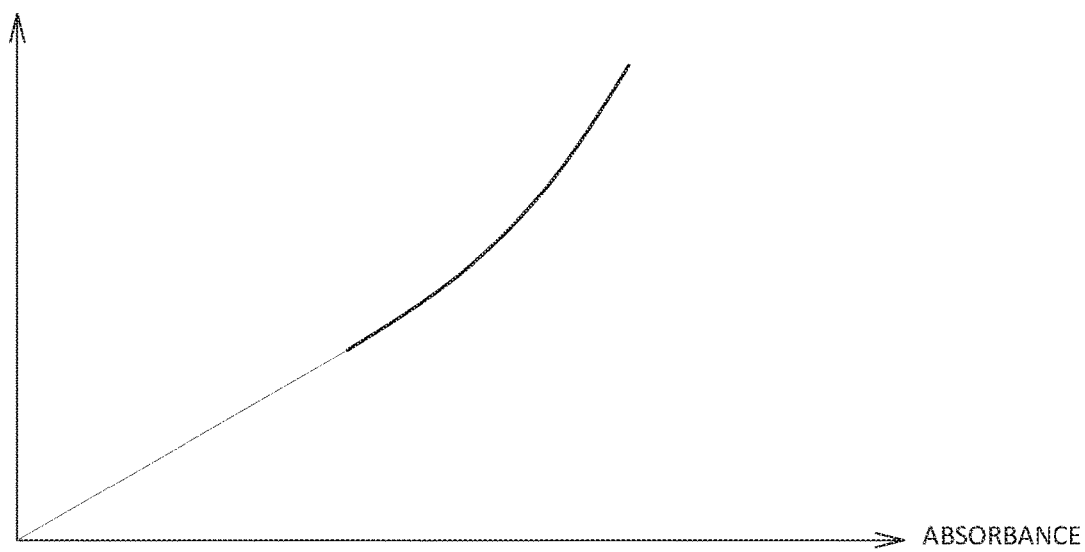
FIG. 5 is a graph schematically showing an example of interference gas partial pressure-absorbance relationship data which is used in the absorption spectroscopic device according to the embodiment.
Figure 6:
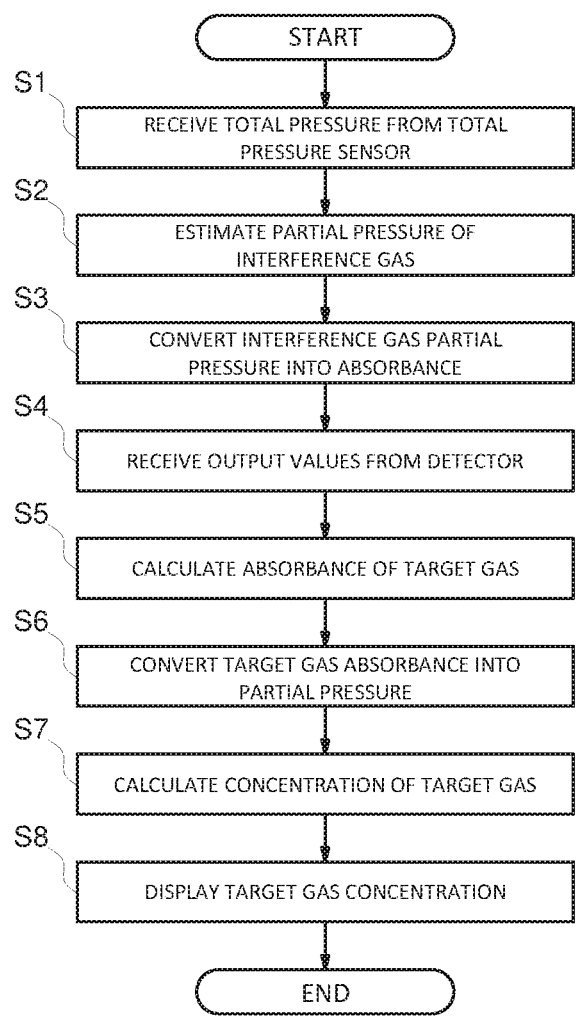
FIG. 6 is a flowchart showing operations of the absorption spectroscopic device according to the embodiment.
Figure 7:
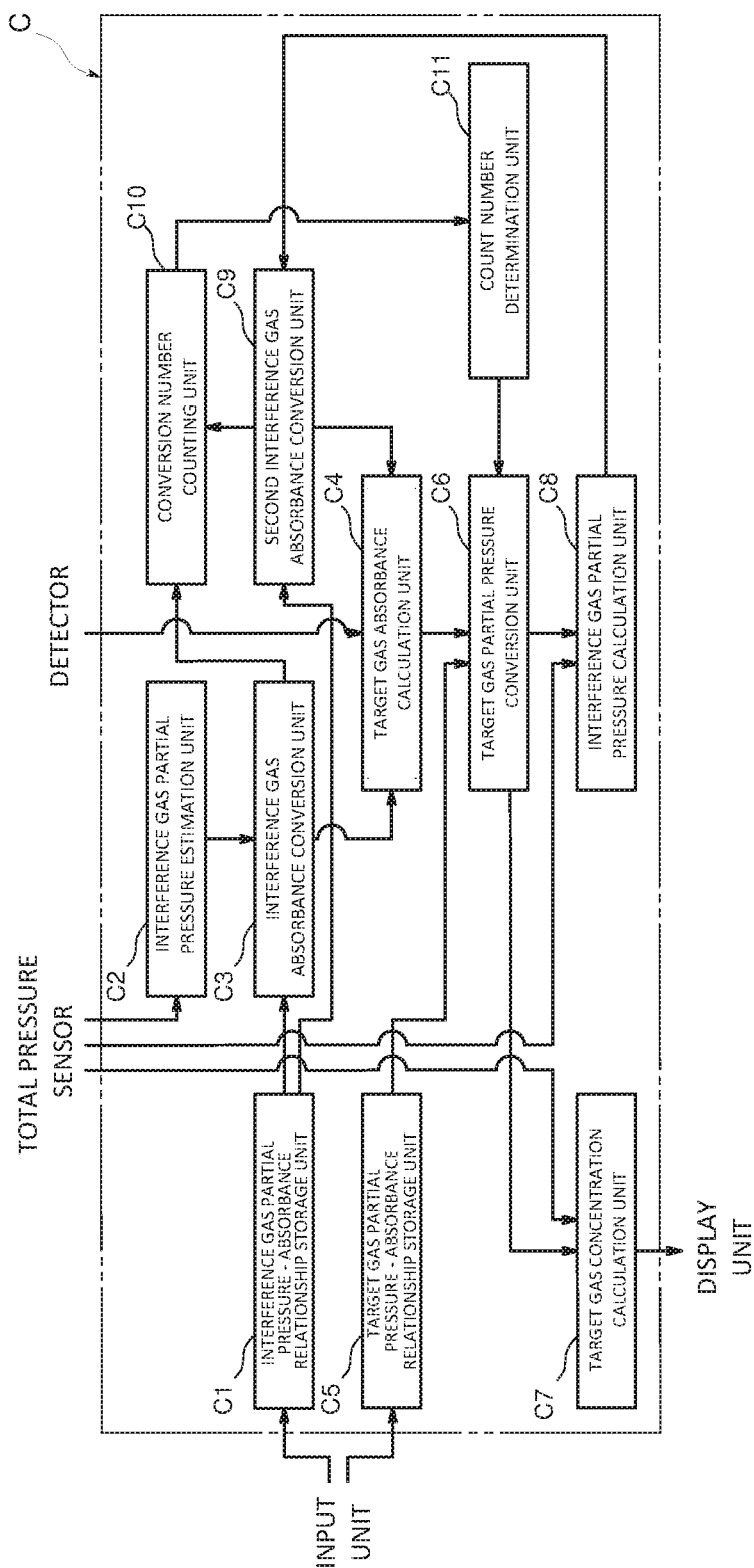
FIG. 7 is a block diagram showing functions of an absorption spectroscopic device according to another embodiment.
Figure 8:
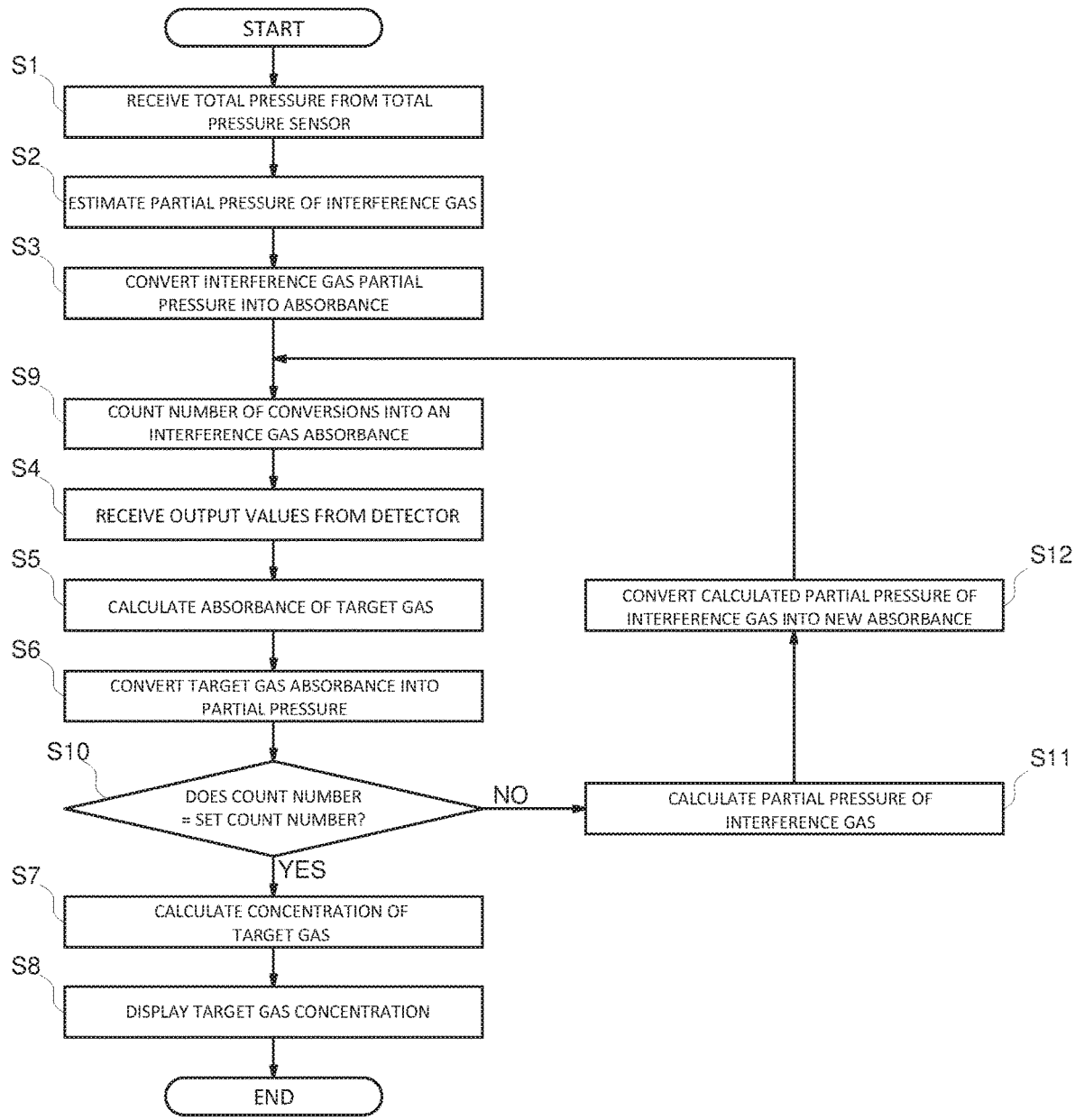
FIG. 8 is a flowchart showing operations of the absorption spectroscopic device according to the other embodiment.

The interference gas partial pressure-absorbance relationship storage unit C1 stores interference gas partial pressure-absorbance relationship data which shows a relationship between the partial pressure and the absorbance of an interference gas. For example, prior to the absorption spectroscopic system 100 performing measurements before being shipped or after being shipped or the like, an interference gas having a known concentration is supplied to the flow path L, and data showing a relationship between the partial pressure and the absorbance of the interference gas present in the measurement area Z of the detector 20 at this time is acquired in advance. This data is then stored as interference gas partial pressure-absorbance relationship data in the interference gas partial pressure-absorbance relationship storage unit C1. Note that the partial pressure of the interference gas may be calculated based on the total pressure measured by the total pressure sensor 10 and on the known concentration of the interference gas. In addition, the absorbance of the interference gas may be calculated based on the output values detected by the detector 20. Moreover, as is shown in FIG. 5, the interference gas partial pressure-absorbance relationship data may be acquired, for example, using a graph showing a relationship between the partial pressure and the absorbance of the interference gas, with the partial pressure and the absorbance of the interference gas being shown respectively on the vertical axis and the horizontal axis of this graph. Note that if an interference gas is used as a calibration gas that is used to calibrate the detector 20 prior to the absorption spectroscopic system 100 being shipped, then the interference gas partial pressure-absorbance relationship data matches the calibration curve data that is used for this calibration. Note also that this interference gas partial pressure-absorbance relationship data can be input via an input unit into the interference gas partial pressure-absorbance relationship storage unit C1.

The interference gas partial pressure estimation unit C2 estimates the partial pressure of an interference gas from the total pressure measured by the total pressure sensor 10 when a gas is introduced into the flow path L. For example, if the concentration of the target gas contained in the gas is low, then the interference gas partial pressure estimation unit C2 estimates the total pressure detected by the total pressure sensor 10 as the partial pressure of the interference gas. Moreover, if the concentration of the target gas contained in the gas is low, then this shows, for example, that a quantity of target gas in the order of several percent is contained in the gas. In this case, the estimated partial pressure of the interference gas contains errors generated by the partial pressure of the target gas. Furthermore, in cases when it cannot be said that the concentration of the target gas contained in the gas is low, then the interference gas partial pressure estimation unit C2 estimates the partial pressure of an interference gas from the predicted concentration of the interference gas and from the total pressure.

The interference gas absorbance conversion unit C3 converts the estimated partial pressure of the interference gas that was estimated by the interference gas partial pressure estimation unit C2 into an absorbance of the interference gas based on the interference gas partial pressure-absorbance relationship data.

When a gas is supplied to the flow path L, the target gas absorbance calculation unit C4 calculates the absorbance of the target gas based on the output values from the detector 20 and on the absorbance of the interference gas calculated (that is, obtained via the conversion performed) by the interference gas absorbance conversion unit C3. More specifically, the target gas absorbance calculation unit C4 acquires, as the absorbance of the target gas, a value obtained by subtracting the absorbance of the interference gas from the absorbance calculated from the output values from the detector 20.

The target gas partial pressure-absorbance relationship storage unit C5 stores target gas partial pressure-absorbance relationship data which shows a relationship between the partial pressure and the absorbance of the target gas. For example, prior to the absorption spectroscopic system 100 performing measurements before being shipped or after being shipped or the like, a target gas having a known concentration is supplied to the flow path L, and data showing a relationship between the partial pressure and the absorbance of the target gas present in the measurement area Z of the detector 20 at this time is acquired in advance. This data is then stored as target gas partial pressure-absorbance relationship data in the target gas partial pressure-absorbance relationship storage unit C5. Note that the partial pressure of the target gas may be calculated based on the total pressure measured by the total pressure sensor 10 and on the known concentration of the target gas. In addition, the absorbance of the target gas may be calculated based on the output values detected by the detector 20. Note that this target gas partial pressure-absorbance relationship data can be input via an input unit into the target gas partial pressure-absorbance relationship storage unit C5.

The target gas partial pressure conversion unit C6 converts the target gas absorbance calculated by the target gas absorbance calculation unit C4 into a partial pressure of the target gas. More specifically, the target gas partial pressure conversion unit C6 converts the absorbance of the target gas into a partial pressure of the target gas based on the target gas partial pressure-absorbance relationship data.

The target gas concentration calculation unit C7 calculates the concentration of the target gas based on the total pressure measured by the total pressure sensor 10, and on the partial pressure of the target gas calculated (that is, obtained via the conversion performed) by the target gas partial pressure conversion unit C6, and then displays this concentration on a display unit.

Next, operations of the absorption spectroscopic device C according to the present embodiment will be described.

Firstly, after a gas has been supplied to the flow path L, then when a start measurement signal is input into the absorption spectroscopic device C, the interference gas partial pressure estimation unit C2 receives a total pressure signal which shows the total pressure measured by the total pressure sensor 10 (step S1). Next, the interference gas partial pressure estimation unit C2 estimates the partial pressure of interference gas contained in the gas based on the pressure shown by the received total pressure signal (step S2). Note that, in step S2, if the concentration of the interference gas contained in the gas is low, then the pressure shown by the received total pressure signal can be estimated as the partial pressure of the interference gas contained in the gas.

Next, the interference gas absorbance conversion unit C3 converts the interference gas partial pressure estimated by the interference gas partial pressure estimation unit C2 into an absorbance of the interference gas by referring to the interference gas partial pressure-absorbance relationship data (step S3).

Next, the target gas absorbance calculation unit C4 receives a gas absorbance signal which shows the absorbance calculated form the output values from the detector 20 (step S4). The target gas absorbance calculation unit C4 takes a difference between the gas absorbance shown by the gas absorbance signal and the interference gas absorbance calculated (i.e. obtained via the conversion performed) by the interference gas absorbance conversion unit C3 as the absorbance of the target gas (step S5).

Next, the target gas partial pressure conversion unit C6 converts the target gas absorbance calculated by the target gas absorbance calculation unit C4 into a partial pressure of the target gas by referring to the target gas partial pressure-absorbance relationship data (step S6).

Next, the target gas concentration calculation unit C7 calculates the concentration of the target gas (step S7) based on the total pressure measured by the total pressure sensor 10, and on the partial pressure of the target gas calculated (i.e. obtained via the conversion performed) by the target gas partial pressure conversion unit C6. Note that the target gas concentration calculation unit C7 then displays the calculated target gas concentration on a display unit (step S8).

Additional Embodiment

A variant example of the absorption spectroscopic device C of the above-described embodiment is an absorption spectroscopic device that, in addition to the functions of the interference gas partial pressure-absorbance relationship storage unit C1, the interference gas partial pressure estimation unit C2, the interference gas absorbance conversion unit C3, the target gas absorbance calculation unit C4, the target gas partial pressure-absorbance relationship storage unit C5, the target gas partial pressure conversion unit C6, and the target gas concentration calculation unit C7, also functions as an interference gas partial pressure calculation unit C8, a second interference gas absorbance conversion unit C9, a conversion number counting unit C10, and a count number determination unit C11.

The interference gas partial pressure calculation unit C8 calculates the partial pressure of the interference gas based on the total pressure measured by the total pressure sensor 10 and on the partial pressure of the target gas calculated (i.e. obtained via the conversion performed) by the target gas partial pressure conversion unit C6. More specifically, the interference gas partial pressure calculation unit C8 takes a difference between the total pressure and the target gas partial pressure as the partial pressure of the interference gas.

The second interference gas absorbance conversion unit C9 converts the partial pressure of the interference gas calculated by the interference gas partial pressure calculation unit C8 into a second absorbance of the interference gas by referring to the interference gas partial pressure-absorbance relationship data.

The conversion number counting unit C10 counts the number of times the interference gas absorbance conversion unit C3 and the second interference gas absorbance conversion unit C9 have performed conversions into interference gas absorbances.

The count number determination unit C11 determines whether or not the count number obtained by the conversion number counting unit C10 has reached a set count number. More specifically, the count number determination unit C11 determines whether or not the count number has reached a set count number of two or more that has been set in advance.

Next, operations of the absorption spectroscopic device C according to this additional embodiment will be described.

In the present embodiment, the number of times a conversion into an interference gas absorbance has been made is counted (step S9) between step S3 and step S4 of the operations performed by the absorption spectroscopic device C of the above-described embodiment. Additionally, in the present embodiment, whether or not the number of times a conversion into an interference gas absorbance has been made (i.e., the count number) has reached a set count number is determined (step S10) between step S6 and step S7 of the operations performed by the absorption spectroscopic device C of the above-described embodiment.

If it is determined that the number of times a conversion into an interference gas absorbance has been made has reached a set count number, then the routine moves to step S7 and step S8, and the concentration of the target gas is displayed on the display unit.

If, on the other hand, it is determined that the number of times a conversion into an interference gas absorbance has been made has not reached a set count number, then the interference gas partial pressure calculation unit C8 calculates the partial pressure of the interference gas (step S11) based on the total pressure measured by the total pressure sensor 10 and on the partial pressure of the target gas acquired by the target gas partial pressure conversion unit C6. The second interference gas absorbance conversion unit C9 then converts (step S12) the partial pressure of the interference gas calculated by the interference gas partial pressure calculation unit C8 into a second absorbance of the interference gas by referring to the interference gas partial pressure-absorbance relationship data. Thereafter, the partial pressure of the target gas is derived based on the second absorbance of the interference gas that was obtained from the conversion performed by the interference gas partial pressure calculation unit C8 via step S4 through step S6. Note that step S9, steps S4 through S6, and steps S10 through S12 are repeated in a loop until the count number of the conversion number counting unit C10 reaches the set count number.

Note that in the above-described additional embodiment, a structure is employed in which the number of loops is counted, and the loops are only ended when the count number reaches the set count number, however, it is also possible to employ a structure in which, for example, whether or not a difference between the target gas partial pressure calculated in a previous loop (for example, the loop immediately prior to the current loop) and the target gas partial pressure calculated in the current loop is smaller than a predetermined value is determined, and if this difference is smaller than the predetermined value, then the loop is ended.

If this type of structure is employed, then as the number of conversions performed by the second interference gas absorbance conversion unit C9 increases, then there is a reduction in the proportion of errors contained in the target gas partial pressure, more specifically, there is a reduction in the proportion of errors for the target gas contained in the estimated interference gas partial pressure which are generated when the interference gas partial pressure is estimated by the interference gas partial pressure estimation unit C2 based on the total pressure measured by the total pressure sensor 10. As a result, the measurement accuracy when measuring the concentration of the target gas is improved.

Moreover, in the above-described embodiment, the total pressure sensor 10 is installed on the upstream side of the flow path L from the detector 20, however, in this case, due to pressure losses generated between the measurement area Z of the detector 20 and the measurement point of the total pressure sensor 10, it is only possible to measure a total pressure that is affected by these pressure losses in the total pressure sensor 10. For this reason, for example, as is shown by the dotted line in FIG. 2, it is preferable that the total pressure sensor 10 be installed such that the measurement point of the total pressure sensor 10 coincides with the measurement area Z of the detector 20. More specifically, it is preferable that the total pressure sensor 10 be installed such that the measurement point of the total pressure sensor 10 is positioned on an optical axis (shown by the single-dot chain line in FIG. 2) of the light emitted from the light source 21 of the detector 20.

Note that, in the above-described embodiment, a method is described in which a target gas having a known concentration is supplied to the detector 20 when the target gas partial pressure-absorbance relationship data is being acquired by the target gas partial pressure-absorbance relationship storage unit C5, however, the present invention is not limited to this. For example, it is also possible to supply to the detector 20 a substitute gas in which the relationship between the partial pressure and absorbance has a known interrelationship with the target gas, and to acquire in advance data which shows the relationship at this time between the partial pressure and absorbance of the substitute gas which is present in the measurement area Z of the detector 20. Thereafter, the target gas partial pressure-absorbance relationship data can be acquired based on this data and on the known interrelationship. The same can also be said for the interference gas partial pressure-absorbance relationship storage unit C3.

Furthermore, it should be understood that the present invention is not limited to the above-described embodiments, and that various modifications and the like may be made thereto insofar as they do not depart from the spirit or scope of the present invention.

DESCRIPTION OF THE REFERENCE NUMERALS

100 . . . Absorption Spectroscopic System
L . . . Flow Path
10 . . . Total Pressure Sensor
20 . . . Detector
C . . . Absorption Spectroscopic Device
C1 . . . Interference Gas Partial Pressure-Absorbance Relationship Storage Unit
C2 . . . Interference Gas Partial Pressure Estimation Unit
C3 . . . Interference Gas Absorbance Conversion Unit
C4 . . . Target Gas Absorbance Calculation Unit C5 . . . Target Gas Partial Pressure-Absorbance Relationship Storage Unit
C6 . . . Target Gas Partial Pressure Conversion Unit
C7 . . . Target Gas Concentration Calculation Unit
C8 . . . Interference Gas Partial Pressure Calculation Unit
C9 . . . Second Interference Gas Absorbance Conversion Unit
C10 . . . Conversion Number Counting Unit
C11 . . . Count Number Determination Unit

What is claimed is:

1. An absorption spectroscopic system that calculates an absorbance of a target gas, comprising:
    a detector that detects an intensity of light of a measurement wavelength transmitted through a gas;
    a total pressure sensor that measures a total pressure of the gas;
    an interference gas partial pressure-absorbance relationship storage that stores interference gas partial pressure-absorbance relationship data, which shows a relationship between a partial pressure of an interference gas and a light absorbance at the measurement wavelength of the interference gas, the interference gas being a gas other than the target gas and contained together with the target gas in the gas, and that absorbs light of the measurement wavelength;
    an interference gas partial pressure estimator that estimates the partial pressure of the interference gas based on the total pressure measured by the total pressure sensor;
    an interference gas absorbance converter that converts an estimated partial pressure of the interference gas estimated by the interference gas partial pressure estimator into an absorbance of the interference gas based on the interference gas partial pressure-absorbance relationship data; and
    a target gas absorbance calculator that calculates the absorbance of the target gas based on output values from the detector and the interference gas absorbance calculated by the interference gas absorbance converter.

2. The absorption spectroscopic system according to claim 1,
    wherein the interference gas partial pressure estimator estimates the total pressure measured by the total pressure sensor as the partial pressure of the interference gas.

3. The absorption spectroscopic system according to claim 1, further comprising:
    a target gas partial pressure-absorbance relationship storage that stores target gas partial pressure-absorbance relationship data; and
    a target gas partial pressure converter that converts the absorbance of the target gas calculated by the target gas absorbance calculator into the partial pressure of the target gas based on the target gas partial pressure-absorbance relationship data.

4. The absorption spectroscopic system according to claim 3, further comprising:
    an interference gas partial pressure calculator that calculates the partial pressure of the interference gas based on the total pressure measured by the total pressure sensor and on the partial pressure of the target gas calculated by the target gas partial pressure converter.

5. The absorption spectroscopic system according to claim 4, further comprising:
    a second interference gas absorbance converter that converts the partial pressure of the interference gas calculated by the interference gas partial pressure calculator into a second absorbance of the interference gas based on the interference gas partial pressure-absorbance relationship data,
    wherein the target gas absorbance calculator calculates a second absorbance of the target gas based on the output values from the detector and on the second interference gas absorbance calculated by the second interference gas absorbance converter.

6. A non-transitory program recording medium on which is recorded a program that is used in an absorption spectroscopic system that calculates an absorbance of a target gas, which comprises a detector that detects an intensity of light of a measurement wavelength transmitted through a gas, and a total pressure sensor that measures a total pressure of the gas, wherein the program causes a computer to function as:
    an interference gas partial pressure-absorbance relationship storage that stores interference gas partial pressure-absorbance relationship data, which shows a relationship between a partial pressure of an interference gas and a light absorbance at the measurement wavelength of the interference gas, the interference gas being a gas other than the target gas and contained together with the target gas in the gas, and that absorbs light of the measurement wavelength;
    an interference gas partial pressure estimator that estimates the partial pressure of the interference gas based on the total pressure measured by the total pressure sensor;
    an interference gas absorbance converter that converts an estimated partial pressure of the interference gas estimated by the interference gas partial pressure estimator into an absorbance of the interference gas based on the interference gas partial pressure-absorbance relationship data; and
    a target gas absorbance calculator that calculates the absorbance of the target gas based on output values from the detector and on the absorbance of the interference gas calculated by the interference gas absorbance converter.

7. An absorbance measurement method for measuring a target gas that is contained in a gas using an absorption spectroscopic system that calculates an absorbance of a target gas, which comprises a detector that detects an intensity of light of a measurement wavelength transmitted through the gas, and a total pressure sensor that measures a total pressure of the gas, wherein the absorbance measurement method includes:
    storing interference gas partial pressure-absorbance relationship data, which shows a relationship between a partial pressure of an interference gas and a light absorbance at the measurement wavelength of the interference gas, the interference gas being a gas other than the target gas and contained together with the target gas in the gas, and that absorbs light of the measurement wavelength, in an interference gas partial pressure-absorbance relationship storage;
    estimating, by an interference partial pressure estimator, the partial pressure of the interference gas based on the total pressure measured by the total pressure sensor;
    converting, by an interference gas absorbance converter, an estimated partial pressure of the interference gas estimated by the interference gas partial pressure estimator into an absorbance of the interference gas based on the interference gas partial pressure-absorbance relationship data; and calculating, by a target gas absorbance calculator, the absorbance of the target gas based on output values from the detector and the interference gas absorbance calculated by the interference gas absorbance converter.

\* \* \* \* \*